US005203954A

United States Patent [19]

Moore

[11] Patent Number: 5,203,954

[45] Date of Patent: Apr. 20, 1993

[54] ADJUSTABLE CORNER BEAD DRYWALL ROLLER

[76] Inventor: David R. Moore, 3195 Lundquist La., Moscow, Id. 83843

[21] Appl. No.: 827,768

[22] Filed: Jan. 29, 1992

[51] Int. Cl.[5] .................... B32B 31/20

[52] U.S. Cl. .................... 156/574; 156/577; 156/579; 29/243.58

[58] Field of Search .................... 156/574, 577, 579, 530; 29/243.58

[56] References Cited

U.S. PATENT DOCUMENTS

| | | | |
|---|---|---|---|
| 763,768 | 6/1904 | Kerns et al. | 156/574 |
| 1,639,134 | 8/1927 | Hale | 156/574 |
| 2,533,209 | 12/1950 | Ames | 156/574 |
| 3,138,512 | 6/1964 | Partin | 156/574 |
| 3,147,008 | 9/1964 | Singleton | 156/574 |
| 4,248,659 | 2/1981 | Bopst | 156/574 |
| 4,373,987 | 2/1983 | Bopst | 156/574 |
| 4,966,756 | 3/1991 | Bright et al. | 29/243.58 |

*Primary Examiner*—Caleb Weston
*Attorney, Agent, or Firm*—H. Jay Spiegel

[57] ABSTRACT

A device is disclosed allowing easy application of tape in a corner of a room. The device includes two plates which are angularly adjustable with respect to each other, with each plate carrying a plurality of rollers. The position of each roller may be adjusted with respect to its plate, as well. An elongated handle having a universal joint is also included.

8 Claims, 3 Drawing Sheets

ADJUSTABLE CORNER BEAD DRYWALL ROLLER

BACKGROUND OF THE INVENTION

The present invention relates to an adjustable corner bead drywall roller. In the prior art, roller mechanisms are known, however, Applicant is unaware of any such device including all of the features and aspects of the present invention.

U.S. Pat. No. 4,996,756 to Bright et al. is known to Applicant. This patent teaches an apparatus for fitting sealing and trimming strips. The present invention differs from the teachings of Bright et al. as contemplating two angularly adjustable plates carrying adjustable rollers thereon.

SUMMARY OF THE INVENTION

The present invention relates to an adjustable corner bead drywall roller. The present invention includes the following interrelated objects, aspects and features:

(a) In a first aspect, the inventive device includes two plates which are angularly adjustable with respect to one another by virtue of a hinge mechanism connecting the plates together. An elongated bolt extends through the hinge mechanism and may be tightened through the use of a wing nut to secure the two plates in a desired angular relationship with respect to one another.

(b) Each plate carries a plurality of rollers, with each roller being contained within an opening formed in its respective plate. Each roller is mounted in its respective opening on two axles, with these axles being adjustable to adjust the particular position of a particular roller in its respective opening.

(c) A manipulating handle is attached to the hinge mechanism through the use of a universal joint with the handle being elongated in nature allowing the device to be used in areas which would be difficult to reach without a ladder.

As such, it is a first object of the present invention to provide an adjustable corner bead drywall roller.

It is a further object of the present invention to provide such a device including two mutually angularly adjustable plates with each plate carrying a plurality of rollers.

It is a still further object of the present invention to provide such a device including a handle attached thereto by virtue of a universal joint.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
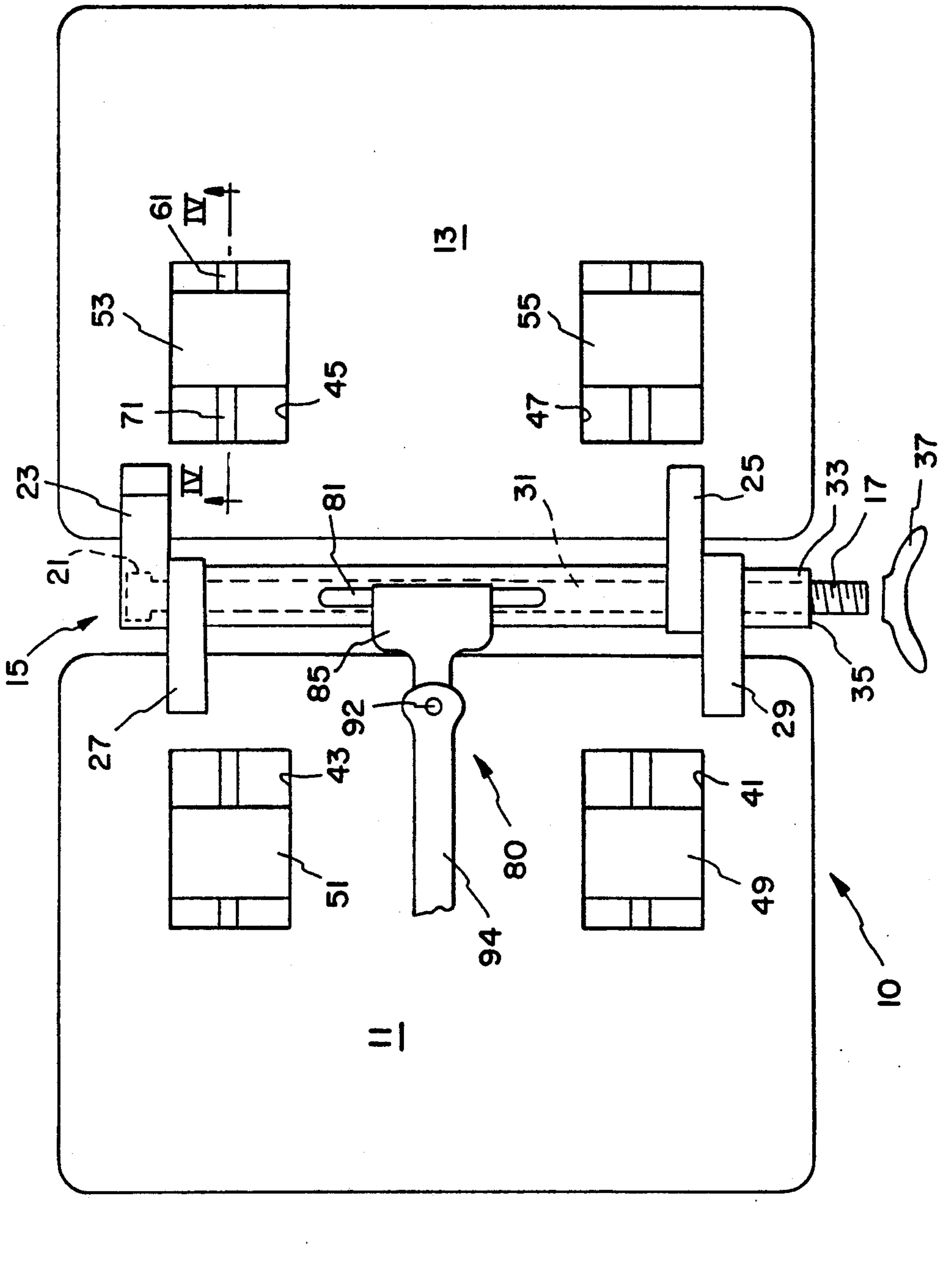
FIG. 1 shows a top view of the present invention.

With reference to the figures, the present invention is generally designated by the reference numeral 10 and is seen to include two plates 11 and 13 connected together at a hinge mechanism generally designated by the reference numeral 15.

Figure 2:
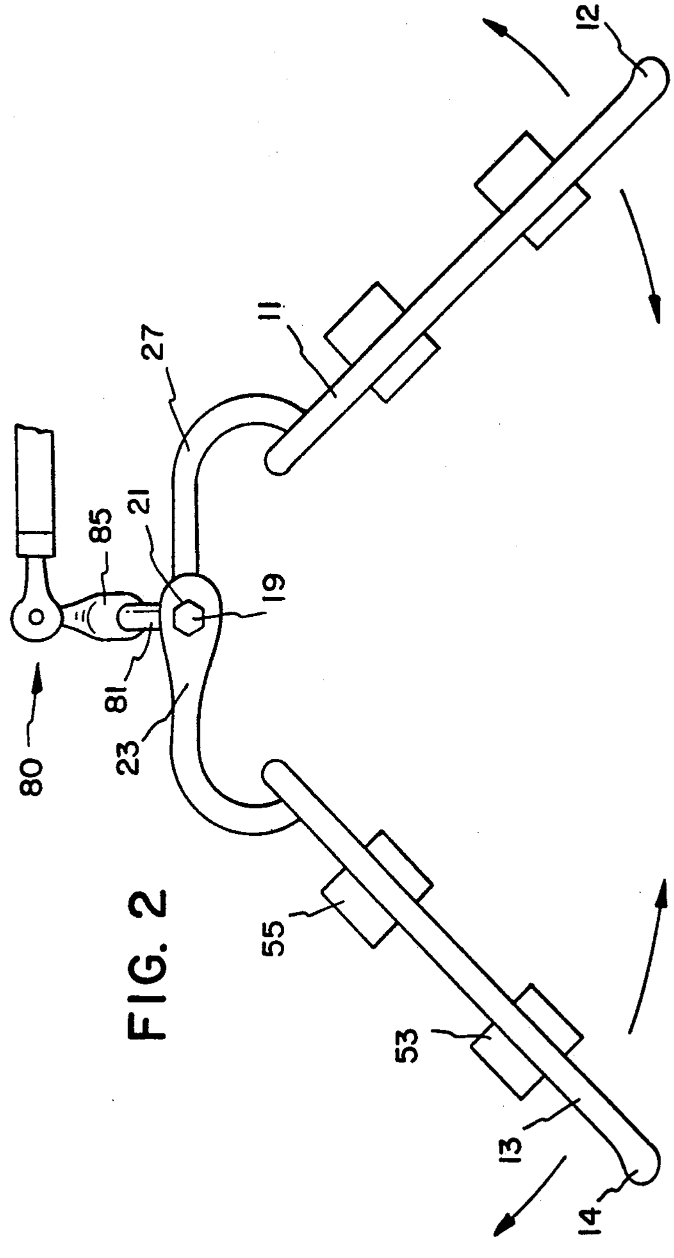
FIG. 2 shows an end view of the present invention.

With particular reference to FIGS. 1 and 2, the hinge mechanism 15 includes an elongated threaded pin 17 having a head 19 receivable within a recess 21 formed in a hinge arm 23 suitably fastened to the plate 13. The plate 13 also has fastened thereto a hinge arm 25.

Similarly, the plate 11 has hinge arms 27 and 29 fastened thereto and having openings to receive the elongated threaded rod 17.

An elongated tube 31 extends between the hinge arms 27 and 25 to maintain the desired spacing therebetween. Similarly, a short tube 33 is located adjacent the hinge arm 29 and has a shoulder 35 against which the wing nut 37 may bear to tighten the assembly together in a desired orientation.

Figure 4:
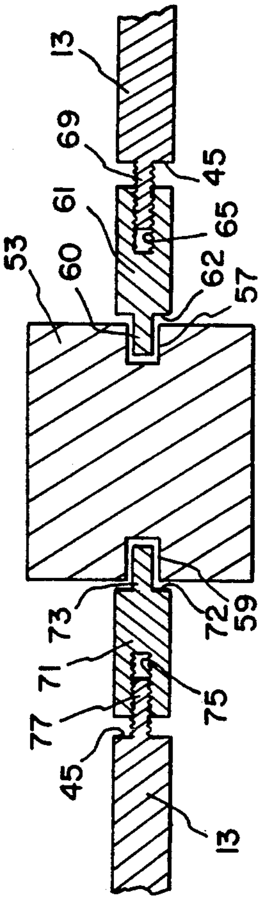
FIG. 4 shows a cross-sectional view along the line IV—IV of FIG. 1.

With particular reference to FIGS. 1 and 4, it is seen that the plate 11 has openings 41 and 43 while the plate 13 has corresponding openings 45 and 47. The respective openings 41, 43, 45 and 47 receive respective rollers 49, 51, 53 and 55. The roller 53 is particularly shown in FIG. 4 and the entire assembly illustrated in FIG. 4 is representative of the manner with which each roller is carried on its respective plate.

With reference to FIG. 4, the roller 53 has two recesses 57 and 59 which are axially aligned. The recess 57 receives the small diameter end of the axle 61, with this end being designated by the reference numeral 60. At the other end of the axle 61, a threaded recess 65 is formed which receives the threaded protrusion 69 of the plate 13.

With further reference to FIG. 4, looking at the other side of the opening 45, the recess 59 receives the end 73 of the axle 71 which also has an elongated threaded recess 75 receiving the threaded protrusion 77 attached within the opening 45 of the plate 13. As should be understood from FIG. 4, in particular, the axles 61 and 71 are adjustable to adjust the particular position of the roller 53 within the opening 45. The elongation of the openings 75 and 65 of the respective axles 71 and 61 facilitates this adjustability. If desired, bearing surfaces may be formed on the axles 61, 71 allowing them to be tightened against the side walls of the roller 53 without impeding rotation thereof. For example, the shoulder 62 of the axle 61 and the shoulder 72 of the axle 71 may be provided with ball bearing rings.

With reference to FIG. 2, the plate 11 is slightly curved at 12 while the plate 13 is slightly curved at 14. These slightly curved portions provide the plates with rounded edges preventing damage to the wall surfaces which are being operated upon using the inventive device 10.

Figure 3:
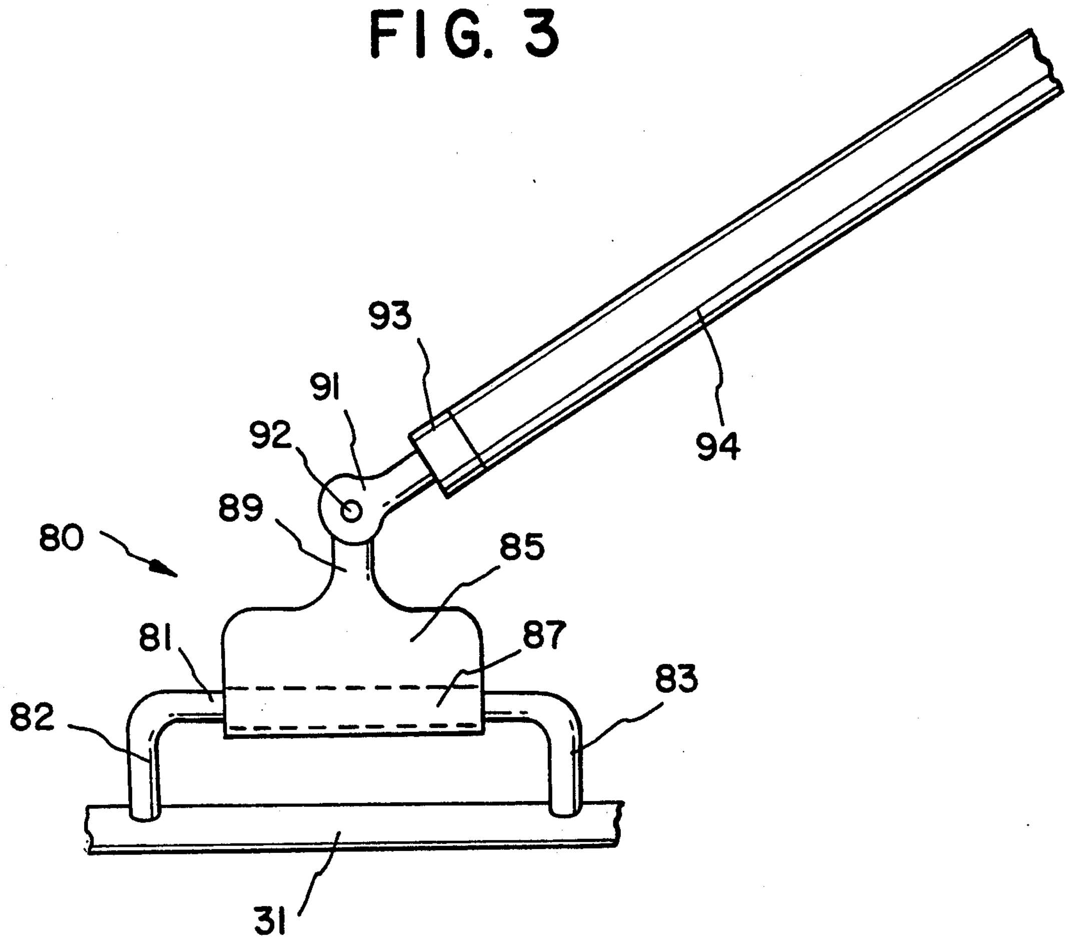
FIG. 3 shows an enlarged view of the handle portion of the present invention.

With reference to FIGS. 1, 2 and 3, it is seen that the elongated sleeve 31 has attached thereto a handle mechanism generally designated by the reference numeral 80. The handle mechanism includes a C-shaped bracket 81 having legs 82 and 83 fastened to the sleeve 31 by suitable means such as, for example, welding. A hinge member 85 has a sleeve portion 87 snugly and rotatably fitting over the bracket 81 to allow rotation thereabout. The hinge member 85 includes an upwardly extending portion 89 having mounted thereon a further hinge member 91 which is rotatably mounted with respect thereto by virtue of the interconnecting pin 92.

The hinge member 91 (FIG. 3) is carried on a fitting 93 fixedly mounted on an elongated handle 94 by any suitable means. The handle mechanism 80, as should be understood with particular reference to FIG. 3, is connected to the elongated sleeve 31 in a universal-type joint allowing rotations in all directions. This interconnection allows the inventive device to be used on wall surfaces which would normally be inaccessible to the user without the provision of a ladder.

As should now be understood, from the above description, when it is desired to use the inventive device 10, the wing nut 37 is loosened and the plates 11 and 13 are engaged over adjacent wall surfaces at their mutual corner. When the plates 11 and 13 are properly aligned with the adjacent wall surfaces, the wing nut 37 may suitably be tightened to fix the angular relationship between the plates 11 and 13.

If desired or necessary, the axial position of the rollers may be adjusted by rotations of the axles carrying each roller as should be understood from the above description of FIG. 4. With the device 10 having been so prepared, drywall tape is applied at the corner and the inventive device 10 is manipulated up and down the corner to securely fasten the tape at the corner of the wall. Once this operation is completed, the inventive device may easily be adjusted to operate at another corner having a differing configuration.

As such, the present invention has been disclosed in terms of a preferred embodiment thereof, which fulfills each and every one of the objects of the invention as set forth hereinabove and provides a new and improved adjustable corner bead drywall roller of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. An adjustable roller device, comprising:

a) a first plate and a second plate, said plates being connected together by a hinge mechanism having a hinge pin, said hinge mechanism permitting adjustment of an angular relationship between said plates;

b) each plate including:

i) an opening;

ii) a roller carried in said opening by axle means;

iii) said axle means being adjustable to facilitate adjustment of a position of said roller in said opening; and c) a manipulating handle.

2. The invention of claim 1, wherein each plate carries two rollers.

3. The invention of claim 1, wherein said hinge mechanism includes a tightening nut allowing releasable fixing of said angular relationship.

4. The invention of claim 1, wherein each said opening is larger than peripheral dimensions of a said roller carried therein.

5. The invention of claim 1, wherein said hinge mechanism has an elongated sleeve, said handle being mounted to said sleeve.

6. The invention of claim 5, wherein said handle is mounted to said sleeve with a universal joint.

7. The invention of claim 1, wherein each plate has a curved end.

8. The invention of claim 1, wherein each said axle means comprises:

a) a pair of threaded posts extending inwardly from a plate opening toward one another;

b) an axle stub having a threaded recess at one end threaded over each post, each axle stub having a protrusion extending therefrom at an end remote from a said threaded recess, said protrusions entering opposed recesses in a roller to rotatably carry said roller in said plate opening.

* * * * *